July 15, 1969        E. C. LETTER        3,455,627
OPTICAL ELEMENT
Filed Jan. 4, 1965
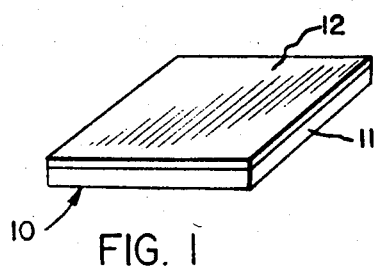
FIG. 1
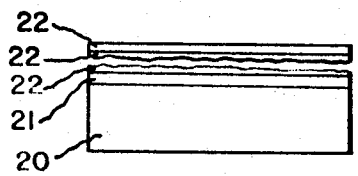
FIG. 2
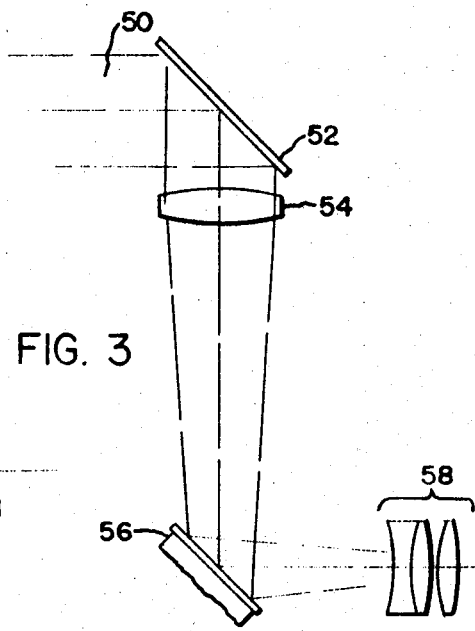
FIG. 3
FIG. 5
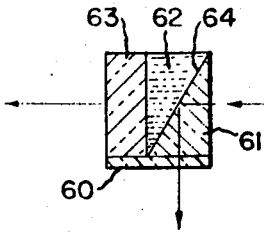
FIG. 4
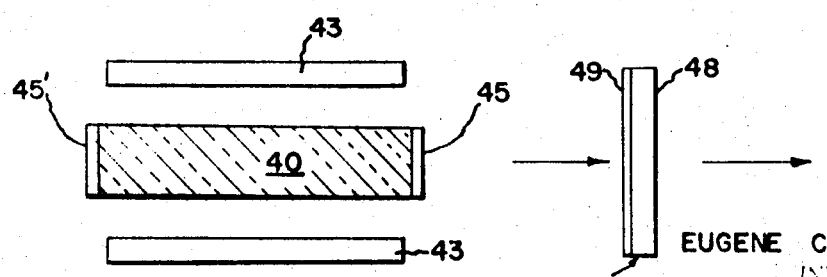
EUGENE C. LETTER
INVENTOR
BY
ATTORNEYS United States Patent Office 3,455,627
Patented July 15, 1969

3,455,627
OPTICAL ELEMENT
Eugene C. Letter, Penfield, N.Y., assignor to Bausch & Lomb Incorporated, Rochester, N.Y., a corporation of New York
Filed Jan. 4, 1965, Ser. No. 423,102
Int. Cl. G02f 1/34
U.S. Cl. 350—160      13 Claims

ABSTRACT OF THE DISCLOSURE

A reflective optical element is disclosed that is responsive to a brief intense pulse of radiation for destruction of its reflective characteristics. The reflective optical element includes radiation absorbing bodies that are responsive to the brief intense pulse of radiation to initiate a thermal activity which destroys the reflective characteristics of at least the portion of the optical element receiving the radiation pulse.

---

This invention relates to an optical element and more particularly to a reflecting element or light valve which is activated by a brief intense flash of radiation.

Recent developments in the field of the production of electromagnetic energy have provided a family of new devices for generating coherent radiation in the infrared, visible and ultraviolet frequency bands. Devices of this type are generally referred to as "lasers." The term "laser" is an acronym taken from light amplification by the stimulated emission of radiation.

Lasers have for the most part been utilized as laboratory light sources since they produce high density coherent radiation. Reports indicating laser applications in various fields which range from eye surgery to machine shop applications have contributed to an increased interest in laser devices. In view of this interest, there presently appears to be a relatively widespread commercial market for a protective laser device wherein a light valve or optical shutter will be closed by a laser.

Advantageously, a device according to the present invention may be activated by a brief intense pulse of electromagnetic radiation. Additionally, the brief intense pulse of radiation produces a change in the optical characteristics in an exceptionally brief interval of time. For example, an optical shutter or light valve according to the present invention may be opened or closed in a brief interval of time. The time interval is dependent upon the energy received from the pulse, however, the time interval has been found to range from a few milliseconds to the so-called "nanosecond" range. One nanosecond is equal to 0.001 microsecond or $1 \times 10^{-9}$ second.

Since the devices disclosed herein operate in extremely short intervals of time, it is also desirable to produce devices of sufficiently large apertures to thereby provide a practical application for the devices. Advantageously, the devices according to the present invention may have relatively large apertures without adversely affecting the extremely high speed. Only that portion of the shutter which is struck by the laser beam is closed. Accordingly, that portion of the element which is not struck by the laser beam will continue to reflect visible light.

Additionally, the devices disclosed herein are applicable as a protective goggle for protecting the eyes of an observer from the harmful effects of laser radiation. A goggle of this type would readily transmit visible light and yet would be activated by a light pulse emanating from a laser to thereby absorb or deflect the harmful intense beam of radiation. The design of the goggle is such that it will include the novel reflecting element according to the present invention. The reflecting element may be disposed in a manner similar to an inclined mirror in a periscope so that visible light will be reflected to the eye of an observer while a pulse of light will be transmitted out of the system.

Briefly, the optical element according to the present invention comprises a diphasic material including a containing matrix and a mass of absorbing particles which are disposed in the containing matrix. The particles are of a size which permit transmission of continuous light. The particle sizes are such that a brief pulse of light heats the particles to thereby destroy a reflecting film or shift the principal absorption band of the element to thereby change the optical characteristics of the element.

The invention will now be described in connection with the accompanying drawings; in which, FIG. 1 is a perspective view illustrating an optical element according to a first embodiment of the invention;

FIG. 2 is a cross sectional view illustrating a second embodiment of the invention;

FIG. 3 is a side elevational view illustrating a device including a shutter according to the first embodiment of the invention;

FIG. 4 is a schematic view illustrating a laser including excitation means for triggering a device according to the first embodiment of the invention; and FIG. 5 is a cross sectional view of an element according to another embodiment of the invention.

An element 10 shown in FIG. 1 may for example, comprise a glass substrate 11 and an aluminum film 12 deposited on the substrate 11. The film 12 includes a mass of carbon particles. The particle may, for example, be sprinkled or sprayed onto a glass substrate prior to depositing the aluminum film. In some cases the particles have been dispersed in a volatile liquid and sprayed onto the substrate. The liquid is then evaporated and an aluminum film is deposited over the particles and onto the substrate by conventional vacuum techniques. Since the carbon particles are between the aluminum film and the glass, the element is arranged as a second surface mirror.

The first surface i.e. the surface receiving an incident light ray may be coated with an anti-reflectant in order to improve the optical characteristics of the system. The back surface may also be coated with a second layer which has a coefficient of thermal expansion different than the first surface. By controlling the substrate temperature during depositions, the aluminum film may be stressed to thereby improve the operation of the device.

The particle size of the powder, the intensity of light and the time of exposure are interdependent, and may be determined by the following formula which has been previously set forth in the Journal of Physical Chemistry, March 1959, pages 433–436 in an article by Nelson and Lundberg.

$$F=\frac{T-T_o}{\alpha_1}\cdot\left\{\frac{(P_1C_p r)}{3}+\frac{K_2\Delta t}{r}+\alpha_1\sigma\Delta t\cdot(T^2+T_o^2)\cdot(T+T_o)\right\}$$

This formula may then be transposed to the following form.

$$(T-T_o)=\frac{\alpha_1 F}{\frac{P_1 C_p r}{3}+\frac{K_2\Delta t}{r}+\alpha\sigma\Delta t\cdot(T^2+T_o^2)\cdot(T+T_o)}$$

wherein:

$C_p$=heat capacity of particle
$(T-T_o)$=temperature rise of a particle
$r$=radius of the particle in cm.
$\alpha_1$=emissivity of the particle
$P_1$=density of the particle
$F$=radiant flux (cal./cm.$^2$)
$t$=duration of light (sec.)
$K_2$=thermal conductivity of matrix
$\sigma$=Stefan-Boltzman rad. const.

The following data illustrates the flux requirements for various time durations of light and the different particle sizes of the carbon disposed in an aluminum film in accordance with the first embodiment of the invention.

$K_2=0.80$ $t=500$ $\mu$sec.$=5\times10^{-4}$ sec.
$r=100\mu$ $F=1.7+20+.00027=20$ cal./cm.$^2$
$r=10\mu$ $F=0.17+200+.00027=200$ cal./cm.$^2$
$r=1\mu$ $F=0.017+2000+.00027=2,000$ cal./cm.$^2$
$r=0.1\mu$ $F=0.0017+20,000+.00027=20,000$ cal./cm.$^2$
$t=1$ $\mu$sec.$=10^{-6}$ sec.
$r=100\mu$ $F=1.7+0.04+5.4\times10^{-7}=1.7$ cal./cm.$^2$
$r=10\mu$ $F=0.17+0.04+5.4\times10^{-7}=0.57$ cal./cm.$^2$
$r=1\mu$ $F=0.017+4.0+5.4\times10^{-7}=4.0$ cal./cm.$^2$
$r=0.1\mu$ $F=0.0017+40.+5.4\times10^{-7}=40.$ cal./cm.$^2$
$t=0.1$ $\mu$sec.$=10^{-7}$ sec.
$r=100\mu$ $F=1.7+0.004+5.4\times10^{-8}=1.7$ cal./cm.$^2$
$r=10\mu$ $F=0.17+0.04+5.4\times10^{-8}=0.21$ cal./cm.$^2$
$r=1\mu$ $F=0.017+0.4+5.4\times10^{-8}=0.42$ cal./cm.$^2$
$r=0.1\mu$ $F=0.0017+4.0+5.4\times10^{-8}=4.0$ cal./cm.$^2$ The particle size and time duration for carbon particles disposed in Hg are illustrated by the following data:

$K_2=.02$ $t=500$ $\mu$sec.$=5\times10^{-4}$ sec.
$r=100\mu=10^{-2}$ cm. $F=1.7+.00027=2.2$ cal./cm.$^2$
$r=10\mu=10^{-3}$ cm. $F=0.17+5.0+.00027=5.2$ cal./cm.$^2$
$r=1\mu=10^{-4}$ cm. $F=0.017+50.+.00027=50.$ cal./cm.$^2$
$r=0.1\mu=10^{-5}$ cm. $F=0.0017+500+.00027=500$ cal./cm.$^2$
$t=1$ $\mu$sec.$=10^{-6}$ sec.
$r=100\mu$ $F=1.7+0.001+5.4\times10^{-7}=1.7$ cal./cm.$^2$
$r=10\mu$ $F=0.17+0.01+5.4\times10^{-7}=0.18$ cal./cm.$^2$
$r=1\mu$ $F=0.017+0.1+5.4\times10^{-7}=0.12$ cal./cm.$^2$
$r=0.1\mu$ $F=0.0017+1.0+5.4\times10^{-7}=1.0$ cal./cm.$^2$
$t=0.1$ $\mu$sec.$=10^{-7}$ sec.
$r=100\mu$ $F=1.7+0.0001+5.4\times10^{-8}=1.7$ cal./cm.$^2$
$r=10\mu$ $F=0.17+0.001+5.4\times10^{-8}=0.17$ cal./cm.$^2$
$r=1\mu$ $F=0.017+0.01+5.4\times10^{-8}=0.03$ cal./cm.$^2$
$r=0.1\mu$ $F=0.0017+0.1+5.4\times10^{-8}=0.10$ cal./cm.$^2$ Additionally the following data is pertinent for carbon particles disposed in water:

$K_2=0.0014$ $t=500$ $\mu$sec.$=5\times10^{-4}$ sec.
$r=100\mu$ $F=1.7+.05+.00027=1.75$ cal./cm.$^2$
$r=10\mu$ $F=0.17+0.5+.00027=0.67$ cal./cm.$^2$
$r=1\mu$ $F=0.017+5.0+.00027=5.02$ cal./cm.$^2$
$r=0.1\mu$ $F=0.0017+50.+.00027=50.$ cal./cm.$^2$ A second and presently preferred embodiment of the invention is illustrated in FIG. 2 wherein a multi-layer film is shown schematically as being deposited on a substrate 20. The temperature of the substrate is controlled during vacuum deposition in order to produce maximum stress in the film layers due to the differences in thermal expansions of the layers. The control of stress by substrate temperature is in accordance with conventional practice which is utilized in the manufacture of multi-layer filters. One example of a suitable film includes the following layers 21 and 22 which are listed in order from the substrate outwardly. The thicknesses of the layers are $\frac{1}{4}\lambda$ wherein $\lambda$ is 540 m$\mu$. The layers comprise lead fluoride, magnesium fluoride, lead fluoride, magnesium fluoride, lead fluoride, magnesium fluoride, lead fluoride, magnesium fluoride, lead fluoride, lead fluoride, magnesium fluoride, lead fluoride, lead fluoride, magnesium fluoride, lead fluoride, lead fluoride, magnesium fluoride, lead fluoride and lead fluoride.

The lead fluoride is partially reduce in order to produce the absorbing particle. For example, when lead fluoride is evaporated from a platinum boat in a vacuum chamber very little reduction occurs. However, when lead fluoride is evaporated from a tungsten boat considerable reduction is obtained. Accordingly, a controlled amount of reduction may be obtained by simultaneously evaporating the lead fluoride from a platinum and a tungsten source or by mixing tungsten powder with the lead fluoride and evaporating the mixture from a platinum boat.

A second method of reducing the lead fluoride comprises exposing the lead fluoride films to a glow discharge or bombarding the film by means of an electron gun. The electron gun could facilitate controlling the size of the reduced particles. In other cases it may be desirable to reduce the lead fluoride by exposing the lead fluoride film to hydrogen at an elevated temperature.

FIG. 3 illustrates an optical shutter which includes an optical element according to the first embodiment of the invention. The light rays passing through an aperture 50 are reflected by an inclined mirror 52. The reflected light passes through a lens 54 and is incident upon an optical element 56. When the shutter is in an open condition the light is reflected by the element 56 and directed through a lens assembly 58. The lens assembly 58 forms an image at a selected image plane (not shown). When a pulse of light flux of predetermined characteristics strikes the element 56 it destroys the reflectivity thereof to thereby close the shutter.

A laser is shown more clearly in FIG. 4. The laser which produces a pulse of coherent light includes a rod 40 such as crystal or glass having reflective and parallel end plates 45, 45'. An energy source such as a plurality of lamps 43 is disposed about the chamber for pumping the laser. The reflectors 45, 45' are disposed adjacent each end of the rod 40 and are adapted to reflect the light generated therein between the reflectors 45, 45' until it is emitted.

An element 47 comprising a substrate 48 and layer 49 is disposed in the ray path of the laser. The laser radiation is effective to change the optical characteristics of that area of the layer 49 which is struck by the laser beam.

Other embodiments of the invention may include absorbing particles which are dispersed in water, hydrocarbon, plastics or other suitable materials. Water, for example, would be volatized by the heated particles to thereby change the characteristics of the element. As illustrated in FIG. 5 a light ray incident upon the element 60 will be transmitted through the prism 61, water 62, and glass plate 63. When a laser beam heats the particles which are dispersed in the water 62, the water is volatized and the beam is reflected or scattered at the surface 64 of the prism 61. Plate 63 could be replaced by a second prism so that the optical density would be constant across the element 60; upon cooling the element returns to its original optical characteristics.

Certain hydrocarbons such as oils or plastics would be used as a transmitting element. The absorption of such elements would be greatly increased by the laser pulse.

While the invention has been described in more detail with reference to specific embodiments, it should be understood that it may be modified or embodied in other forms without departing from the scope of the appended claims.

I claim:

1. A reflective optical element responsive to a brief intense pulse of radiation for the destruction of its reflective characteristics comprising:
   a substrate with a diphasic material disposed thereon;
   said diphasic material containing a transparent or partially transparent matrix and a mass of radiation absorbing particles;
   said diphasic material and said substrate so arranged and constructed in combination with a reflecting material to form a normally radiation reflecting element;
   said radiation absorbing particles responsive to the brief intense pulse of radiation causing a thermal activity that destroys the reflective characteristic, the particle size of the absorbing particles, the intensity of radiation and the time of exposure have values in the order of that determined by the following formula.

$$(T-T_o) = \frac{\alpha_1 F}{\frac{P_1 C_p r}{3} + \frac{K_2 \Delta t}{r} + \alpha_1 \Delta t \cdot (T^2 + T_o^2) \cdot (T + T_o)}$$

wherein:

$C_p$ = heat capacity of particle
$(T-T_o)$ = temperature rise of a particle
$r$ = radius of the particle
$\alpha_1$ = emissivity of the particle
$P_1$ = density of the particle
$F$ = radiant flux (cal./cm.²)
$t$ = duration of radiation (sec.)
$K_2$ = thermal conductivity of matrix
$\sigma$ = Stefan-Boltzman rad. const.

2. An optical element according to claim 1 in which the absorbing particles comprise powdered carbon and the containing matrix comprises an aluminum film.

3. An optical element according to claim 1 in which the absorbing particles comprise carbon and the containing matrix comprises mercury.

4. An optical element according to claim 1 in which the diphasic in material is in a prestressed condition.

5. An optical shutter comprising a radiation transparent container formed with a cavity providing a radiation reflective surface when empty and a liquid diphasic material including a liquid matrix and a mass of radiation absorbing particles suspended in said liquid positioned in said cavity wherein the combination of said diphasic material and said radiation transparent container form a radiation transmitting element, the particles are responsive to a brief intense pulse of radiation to initiate a thermal activity resulting in the volatization of said liquid and changing the optical shutter into a radiation reflective element.

6. An optical shuter as defined in claim 5 wherein the size of the particles, the intensity of radiation and the time of exposure are in the order of values determined from the following equation:

$$(T-T_o) = \frac{\alpha_1 F}{\frac{P_1 C_p r}{3} + \frac{K_2 \Delta t}{r} + \alpha_1 \sigma \Delta t \cdot (T^2 + T_o^2) \cdot (T + T_o)}$$

wherein:

$C_p$ = heat capacity of particle
$(T-T_o)$ = temperature rise of a particle
$r$ = radius of the particle
$\alpha_1$ = emissivity of the particle
$P_1$ = density of the particle
$F$ = radiant flux (cal./cm.²)
$t$ = duraiton of radiation (sec.)
$K_2$ = thermal conductivity of matrix
$\sigma$ = Stefan-Boltzman rad. const.

7. An optical element according to claim 6 wherein the absorbing particles comprise carbon and the liquid matrix comprises water.

8. A reflective optical element responsive to a brief intense pulse of radiation for destruction of its reflective characteristics comprising a plurality of alternate lead fluoride and magnesium fluoride layers forming a radiation reflective multi-layer film, said lead fluoride layers being partially reduced to include radiation absorbing lead centers.

9. Reflective optical element according to claim 8 wherein said plurality of layers are responsive to the brief intense pulse of radiation to initiate a thermal reaction and destroy the reflective characteristics of at least that portion of the layers receiving said intense pulse, and wherein the average size of the lead centers, the intensity of radiation and the time of exposure are in the order of the values determined from the following equation:

$$(T-T_o) = \frac{\alpha_1 F}{\frac{P_1 C_p r}{3} + \frac{K_2 \Delta t}{r} + \alpha_1 \sigma \Delta t \cdot (T^2 + T_o^2) \cdot (T + T_o)}$$

wherein:

$C_p$ = heat capacity of center
$(T-T_o)$ = temperature rise of a center
$r$ = radius of the center
$\alpha_1$ = emissivity of the center
$P_1$ = density of the center
$F$ = radiant flux (cal./cm.²)
$t$ = duration of radiation (sec.)
$K_2$ = thermal conductivity of the layers
$\sigma$ = Stefan-Boltzman rad. const.

10. A reflective optical element as defined in claim 9 wherein said plurality of layers are prestressed.

11. A reflective optical element as defined in claim 9 wherein said alternate layers of lead fluoride and magnesium fluoride have thicknesses that are quarter wavelengths of a predetermined wavelength.

12. A reflective optical element as defined in claim 11 wherein said plurality of alternate layers comprise lead fluoride, magnesium fluoride, lead fluoride, magnesium fluoride, lead fluoride, magnesium fluoride, lead fluoride, magnesium fluoride, lead fluoride, lead fluoride, magnesium fluoride, lead fluoride, lead fluoride, magnesium fluoride, lead fluoride, lead fluoride, magnesium fluoride, lead fluoride and lead fluoride.

13. In a multi-layer reflective optical element including a plurality of dielectric quarter wavelength films, wherein alternate films exhibit high and low indices of refraction and said films are in planar juxtapositional relationship and cohesive with each other to form a radiation reflective element, the improvement comprising metallic colloidal centers included in alternate films that comprise radiation adsorbing bodies,
    said plurality of films being responsive to a brief intense pulse of radiation to initiate a thermal activity that destroys the reflective characteristic of the portion of said films receiving radiation, the intensity of the radiation, the time of exposure and the average size of the center have values that are in the order of the values determined by the following formula:

$$(T-T_o) = \frac{\alpha_1 F}{\frac{P_1 C_p r}{3} + \frac{K_2 \Delta t}{r} + \alpha_1 \sigma \Delta t \cdot (T^2 + T_o^2) \cdot (T + T_o)}$$

wherein:

$C_p$ = heat capacity of center
$(T-T_o)$ = temperature rise of a center $r$ = radius of the center
$\alpha_1$ = emissivity of the center
$P_1$ = density of the center
$F$ = radiant flux (cal./cm.$^2$)
$t$ = duration of radiation (sec.)
$K_2$ = thermal conductivity of films
$\sigma$ = Stefan-Boltzman rad. const.

References Cited

UNITED STATES PATENTS

| | | | |
|---|---|---|---|
| 2,305,799 | 12/1942 | Vierling | 350—160 |
| 2,444,976 | 7/1948 | Brown | 350—1 |
| 2,971,853 | 2/1961 | Stookey | 350—160 |
| 3,169,163 | 2/1965 | Nassenstein | 350—160 |

OTHER REFERENCES

Nelson et al., Heterogeneous Flash Initiation of Thermal Reactions, Journal of Physical Chemistry, vol. 63 (March 1959) pp. 433–436.

RONALD I. WIBERT, Primary Examiner

WILLIAM L. SIKE, Assistant Examiner

U.S. Cl. X.R.

350—288

PO-1050
(5/69)

UNITED STATES PATENT OFFICE
CERTIFICATE OF CORRECTION

Patent No. 3,455,627          Dated    July 15, 1969

Inventor(s)   Eugene C. Letter

It is certified that error appears in the above-identified patent and that said Letters Patent are hereby corrected as shown below:

Column 3, line 49, after "F=1.7" insert -- +0.5 --

Column 6, line 60, change "adsorbing" to -- absorbing --

SIGNED AND
SEALED
SEP 22 1970

(SEAL)
Attest:

Edward M. Fletcher, Jr.
Attesting Officer

WILLIAM E. SCHUYLER, JR.
Commissioner of Patents